United States Patent [19]

Hibi

[11] Patent Number: 5,103,693
[45] Date of Patent: Apr. 14, 1992

[54] CONTROL SYSTEM FOR TRANSMISSION

[75] Inventor: Toshifumi Hibi, Yokohama, Japan

[73] Assignee: Nissan Motor Co., Ltd., Yokohama, Japan

[21] Appl. No.: 489,058

[22] Filed: Mar. 7, 1990

[30] Foreign Application Priority Data

Mar. 8, 1989 [JP] Japan .................................. 1-53925

[51] Int. Cl.⁵ .............................................. B60K 41/04
[52] U.S. Cl. ........................................ 74/866; 74/862; 74/336 B; 474/72
[58] Field of Search ............. 74/336 B, 665 GE, 865, 74/866, 862, 877; 474/18, 28, 72

[56] References Cited

U.S. PATENT DOCUMENTS

| | | | |
|---|---|---|---|
| 3,011,353 | 12/1961 | Friedrich et al. | 474/72 X |
| 3,442,346 | 5/1969 | Winter et al. | 474/72 X |
| 4,548,100 | 10/1985 | Hohn | 74/689 |
| 4,579,021 | 4/1986 | Yamamura et al. | 74/869 |
| 4,735,113 | 4/1988 | Yamamuro et al. | 74/866 |
| 4,736,652 | 4/1988 | Shimamoto | 74/665 GE |
| 4,829,433 | 5/1989 | Nakano et al. | 364/424 |
| 4,881,925 | 11/1989 | Hatbri | 74/865 X |
| 4,895,552 | 1/1990 | Abo et al. | 474/28 |

FOREIGN PATENT DOCUMENTS

| | | |
|---|---|---|
| 227914 | 9/1959 | Australia ........................ 74/665 GE |
| 71801 | 2/1983 | European Pat. Off. . |
| 093413 | 11/1983 | European Pat. Off. . |
| 1111854 | 6/1984 | European Pat. Off. . |
| 123083 | 10/1984 | European Pat. Off. . |
| 53-137375 | 11/1978 | Japan . |
| 56-97661 | 8/1981 | Japan . |
| 58-28046 | 2/1983 | Japan ............................... 74/336 B |
| 58-146756 | 9/1983 | Japan . |
| 60-249758 | 12/1985 | Japan . |
| 61-105351 | 5/1986 | Japan . |
| 61-105353 | 5/1986 | Japan . |
| 63-31833 | 2/1988 | Japan . |
| 63-176862 | 7/1988 | Japan . |

Primary Examiner—Leslie A. Braun
Assistant Examiner—Benjamin Levi
Attorney, Agent, or Firm—Foley & Lardner

[57] ABSTRACT

A control system for a hybrid transmission of a motor vehicle comprises a vehicle speed sensor and a control unit. In the control unit, a deceleration is calculated. When the deceleration is greater than the predetermined deceleration value under a condition where the vehicle speed is less than a predetermined vehicle speed value, a switch is effected from a torque delivery path through a continuously variable transmission mechanism to a torque delivery path through a gearing mechanism. Thus, there occurs no slip between a V-belt and a driver pulley in the continuously variable mechanism upon acceleration immediately after rapid deceleration.

4 Claims, 7 Drawing Sheets

|  | P | R | N | D | L |
|---|---|---|---|---|---|
| FORWARD CLUTCH 52 |  |  |  | ◯ | ◯ |
| REVERSE CLUTCH 53 |  | ◯ |  |  |  |
| LOW CLUTCH 44 |  | ◯ |  | ◯ | ◯ |
| HIGH CLUTCH 60 |  |  |  | ◯ | ◯ |
| DRIVER PULLEY CYLINDER CHAMBER 20 |  |  |  | ◯ | ◯ |
| FOLLOWER PULLEY CYLINDER CHAMBER 32 | ◯ | ◯ | ◯ | ◯ | ◯ |
| POSITION OF VALVE 108 | OVER-STROKE POSITION | OVER-STROKE POSITION | OVER-STROKE POSITION | NORMAL POSITION | NORMAL POSITION |

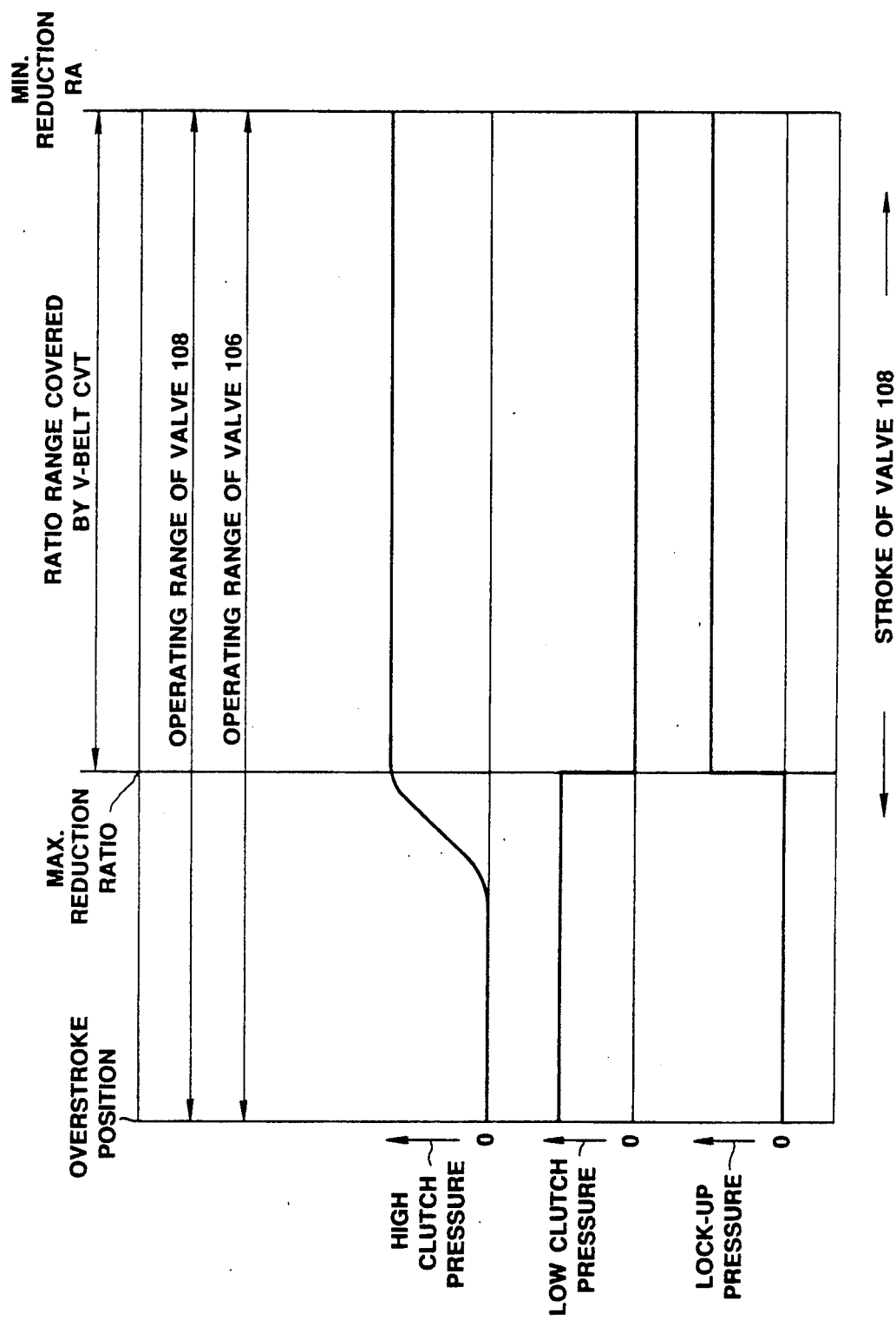

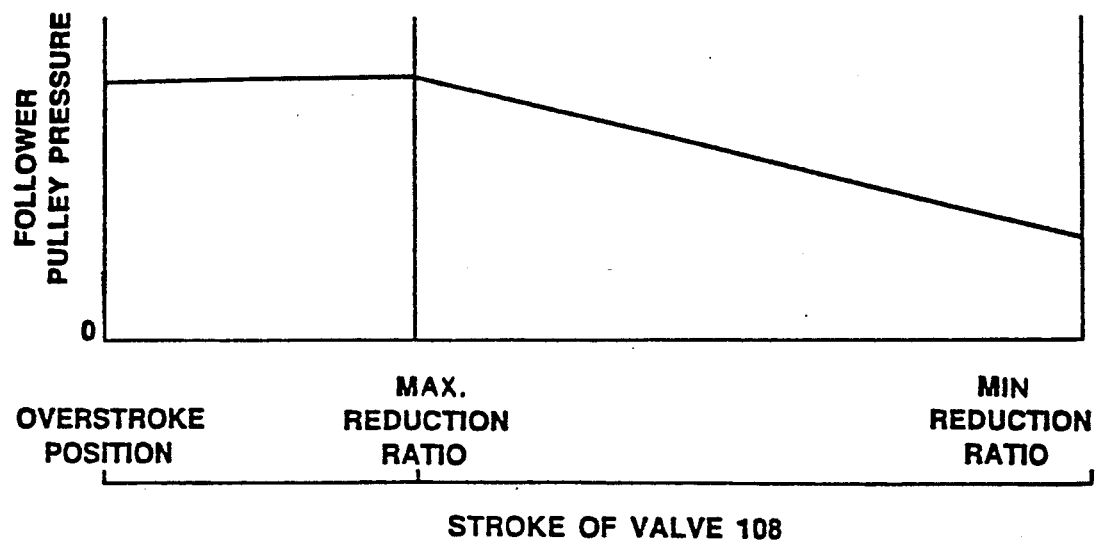
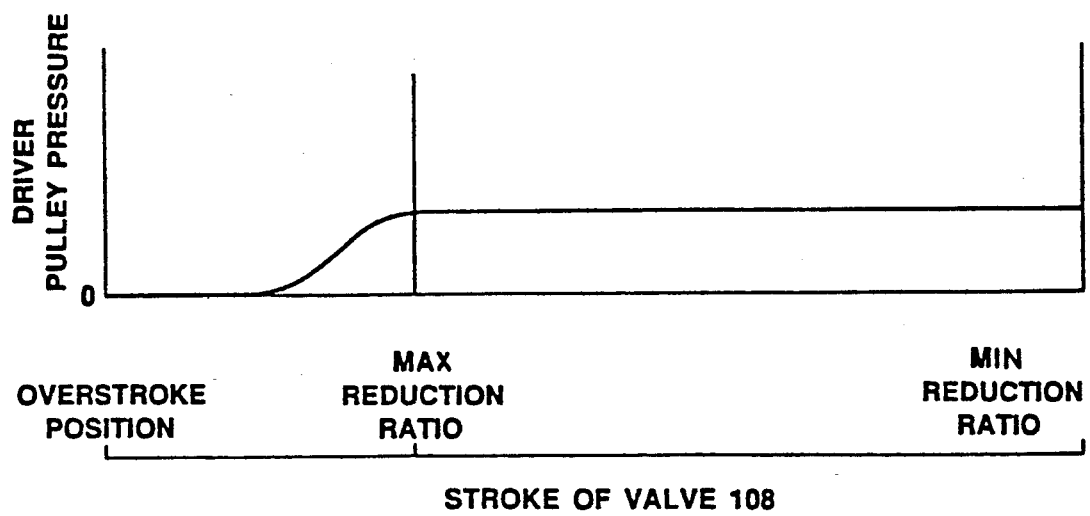

CONTROL SYSTEM FOR TRANSMISSION

RELATED APPLICATIONS AND PATENTS

U.S. patent application Ser. No. 07/278,887, filed Dec. 2, 1988, now U.S. Pat. No. 4,907,471, by Wataru ISHIMARU for a V-belt type continuously variable transmission. This Application corresponds to European Patent Application No. 88 120 186.7.

U.S. patent application Ser. No. 07/330,919, filed on Mar. 31, 1989, now U.S. Pat. No. 4,955,260, by Toshikazu OSHIDARI for a hydraulic control system for a transmission.

U.S. patent application Ser. No. 07/330,918, filed on Mar. 31, 1989 by Keiju ABO et al. for a control system for a transmission (now U.S. Pat. No. 4,895,552 issued on Jan. 23, 1990). This Application corresponds to European Patent Application No. 89 105 734.1.

U.S. patent application Ser. No. 07/336,422, filed on Apr. 11, 1989, now U.S. Pat. No. 5,063,815, by Toshikazu OSHIDARI for a line pressure control for a V-belt type continuously variable transmission.

U.S. patent application Ser. No. 07/348,837, filed on May 8, 1989 by Wataru ISHIMARU for a system for controlling hydraulic fluid pressure for a V-belt type automatic transmission.

BACKGROUND OF THE INVENTION

The present invention relates to a control system for a transmission.

U.S. Pat. No. 4,735,113 discloses a V-belt type continuously variable transmission including a driver pulley, a folower pulley, and a V-belt drivingly interconnecting these pulleys. Laid-open Japanese Patent Application 63-176862 and U.S. patent application Ser. No. 07/278,887 disclose a transmission in which the above-mentioned continuously variable transmission mechanism is combined with a gearing mechanism such that the gearing mechanism plays a role in providing a reduction ratio larger than the largest reduction provided by the continuously variable transmission. In the continuously variable transmission of the type using a V-belt, the V-belt slips upon acceleration after rapid deceleration, causing a damage on the V-belt. The V-belt is disposed in pulley grooves of the driver and follower pulleys. The width of each of the pulley grooves is variable by varying hydraulic fluid pressure supplied to the pulley. At rapid deceleration, hydraulic fluid pressure supplied to the driver pulley is decreased to allow an increase in the width of the pulley groove thereof, causing a shift toward the largest reduction ratio. Upon acceleration immediately after this rapid deceleration, hydraulic fluid pressure supplied to the driver pulley is not high enough to generate a gripping force with which the driver pulley grips the V-belt. However, the driver pulley is subject to a large torque before there occurs a sufficient friction between the V-belt and the driver pulley. Thus, a slip occurs between the V-belt and the driver pulley. This problem is encountered in the latter mentioned hybrid transmission including the continuously variable transmission mechanism combined with the gearing mechanism.

The present invention aims at improving a control system for a transmission including a gearing mechanism combined with a continuously variable transmission such that the above-mentioned problem is not encountered.

SUMMARY OF THE INVENTION

According to the present invention, there is provided a control system for a hybrid transmission of a motor vehicle, the hybrid transmission including a continuously variable transmission mechanism being combined with a gearing mechanism, the control system comprising; means for detecting a vehicle speed of the motor vehicle and generating a vehicle speed indicative signal indicative of the vehicle speed detected; means for detecting a deceleration which the motor vehicle is subject to and generating a deceleration indicative signal indicative of said deceleration detected, and means for effecting a switch from a torque delivery path through the continuously variable transmission to a torque delivery path through the gearing mechanism when said vehicle speed indicative signal indicates that the vehicle speed is lower than a predetermined vehicle speed value under a condition where the deceleration indicative signal indicates that a magnitude of deceleration is greater than a predetermined deceleration value.

According to another aspect of the present invention, there is provided a control method for a hybrid transmission of a motor vehicle, the hybrid transmission including a continuously variable transmission mechanism is combined with a gearing mechanism, the control method comprising the steps of; detecting a vehicle speed of the motor vehicle and generating a vehicle speed indicative signal indicative of the vehicle speed detected, detecting a deceleration which the motor vehicle is subject to and generating a deceleration indicative signal indicative of said deceleration detected, and effecting a switch from a torque delivery path through the continuously variable transmission to a torque delivery path through the gearing mechanism when said deceleration indicative signal indicates that a magnitude of deceleration is greater than a predetermined deceleration value under a condition where said vehicle speed indicative signal indicates that the vehicle speed is lower than a predetermined vehicle speed value.

BRIEF DESCRIPTION OF THE DRAWINGS

FIG. 6 is a graphical representation of variation of different kinds of pressure versus the stroke of valve 108;

FIG. 7a and 7b are graphical representations of variation of pressures applied to driver and follower pulley cylinder chambers of the continuously variable transmission mechanism;

DETAILED DESCRIPTION OF THE EMBODIMENT

Referring to the accompanying drawings, a preferred embodiment of a control system according to the present invention is described.

Figure 1:
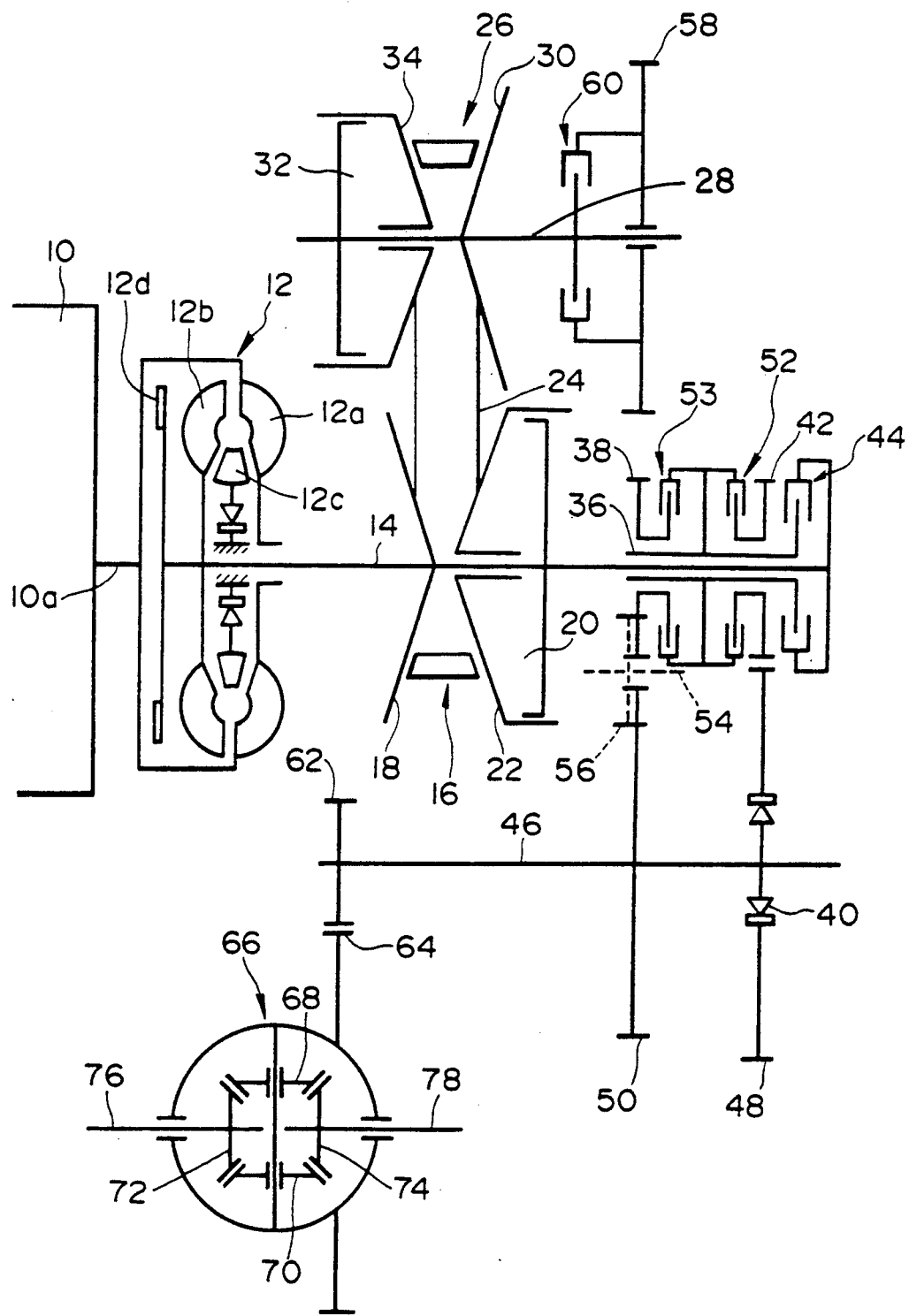
FIG. 1 is a schematic diagram of a hybrid transmission including a gearing mechanism combined with a continuously variable transmission mechanism.
Figures 2, 5:
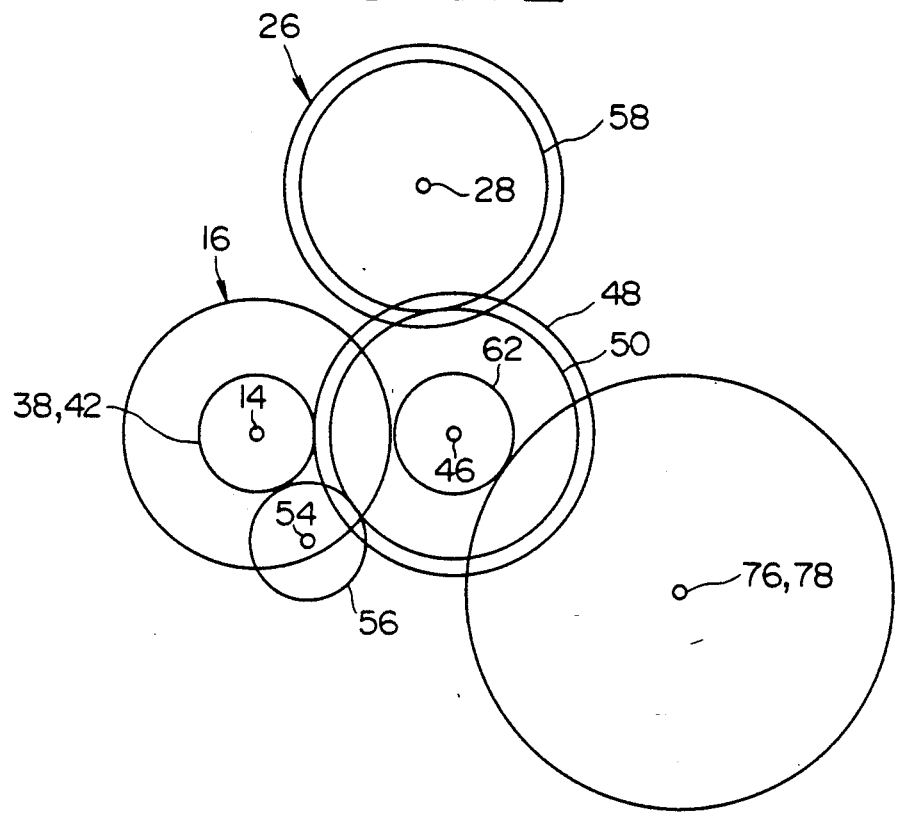
FIG. 2 is a diagram illustrating arrangement of a variety of different shafts of the transmission.
FIG. 5 is a table.

Referring now to FIG. 1, a power train of a motor vehicle is described. In FIG. 1, an engine 10 is shown as having an output shaft 10a which a torque converter 12 is coupled with in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. The driver pulley 16 includes an axially stationary conical member 18 fixedly connected to the driver shaft 14, and an axially moveable conical member 22 connected to the driver shaft 14 in opposed spaced relationship with the stationary conical member 18. The conical members 18 and 22 define therebetween a V-shaped pulley groove. The driver pulley 16 includes a driver pulley cylinder chamber 20. The moveable conical member 22 is axially moveable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially moveable conical member 34 connected to the follower shaft 28 for axial movement. The conical members 30 and 34 define a V-shaped pulley groove therebetween. The folower pulley 26 includes a follower pulley cylinder chamber 32. The moveable conical member 34 is axially moveable toward the stationary conical member 30 in response to hydraulic pressure developed in the follower pulley cylinder chamber 32. The driver pulley 16, V-belt 24, and follower pulley 26 form a V-belt type continuously variable transmission mechanism. The setting is such that the maximum and largest reduction ratio provided by this V-belt type continuously variable transmission mechanism only is smaller than a reduction ratio provided by a forward gear 42 and a forward gear 48, which are described later. The driver shaft 14 extends through a hollow shaft 36. The hollow shaft 36 is rotatably supported on the driver shaft 14. Rotatably supported on the hollow shaft 36 are a reverse gear 38 and a forward gear 42. The forward gear 42 is connectable to the hollow shaft 36 by means of a hydraulic fluid operated forward clutch 52, while the reverse gear 38 is connectable to the hollow shaft 36 by means of a hydraulic fluid operated reverse clutch 53. With a hydraulic fluid operated low clutch 44 engaged, the driver shaft 14 is connected to the hollow shaft 36. Extending in parallel to the driver shaft 14 is an output shaft 46. The forward gear 48 is mounted via a one-way clutch 40 to the output shaft 46, while a reverse gear 50 is mounted for unitary rotation with the output shaft 46. The forward gear 48 is in constant mesh with the forward gear 42. The reverse gear 50 is in constant mesh with a reverse idler gear 56 that is rotatable with an idler shaft 54. The reverse idler gear 56 is in constant mesh with the reverse gear 38, too. In FIG. 1, since it is impossible to illustrate them in the cross sectional plane, the reverse idler shaft 54 and reverse idler gear 56 are illustrated by the broken line. Actually, they are arranged as illustrated in FIG. 2. In FIG. 1, the distance between the shafts and the diameter of each of the gears do not reflect the actual dimension. Thus, in order to known the actual relationship, reference should be made to FIG. 2. The follower shaft 28 has a forward gear 58. Via a hydraulic fluid operated high clutch 60, the forward gear 58 is connectable to the follower shaft 28. As best seen in FIG. 2, the forward gear 58 is in constant mesh with the reverse gear 50. The forward gear 58 and reverse gear 50 have the same diameter. The output shaft 46 has a reduction gear 62 for rotation therewith. The reduction gear 62 is in constant mesh with a final gear 64 of a differential 66. The differential 66 includes a pair of pinion gears 68 and 70 which are rotatable with the final gear 64. A pair of side gears 72 and 74 mesh with the pinion gears 68 and 70. The side gears 72 and 74 are coupled with drive shafts 76 and 78, respectively, for rotation therewith.

The neutral state is provided when the low clutch 44 and the high clutch 60 are both released. In this state, the transmission of torque from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the torque of the output shaft 10a of the engine 10 is transmitted via the torque converter 12 to the driver shaft 14, and further to the hollow shaft 36 via the low clutch 44 that is engaged. The torque of the hollow shaft 36 is transmitted via the forward clutch 52 to the forward gear 42, and further to the forward gear 48 which the gear 42 meshes with. Owing to the fact that the forward gear 48 is drivingly connected via the one-way clutch 40 to the output shaft 46, the torque is transmitted to the output shaft 46. Thereafter, the torque is transmitted via the reduction gear 62 and the final gear 64 to the differential 66 where it is distributed between the drive shafts 76 and 78, causing wheels of the vehicle, not illustrated, to rotate. During the transmission of torque mentioned above, the torque is not transmitted through the continuously variable transmission mechanism, but through the gearing mechanism. At the reduction ratio provided by the intermeshed forward gears 42 and 48, the torque is increased, thus providing a relatively large driving force.

When the operating condition progresses and now demands a less driving force, the high clutch 60 is engaged with the above described state maintained. This causes the torque to be transmitted through the continuously variable transmission. The torque of the driver shaft 14 is transmitted via the V-belt 24 and the follower pulley 26 to the follower shaft 28, and further to the forward gear 58 via the high clutch 60 that is engaged. Since the forward clutch 58 meshes with the reverse gear 50, the torque is transmitted to the output shaft 46, and further to the driver shafts 76 and 78 via the same power path as previously described. In this case, the output shaft 46 rotates at a higher speed than the forward gear 48 does, and thus the one-way clutch 40 idles. This allows the low clutch 44 to be kept engaged. In the manner as described above, the torque is transmitted through the continuously variable transmission mechanism. Thus, the reduction ratio can be varied continuously by varying the width of the V-groove of the driver pulley 26 which in turn induces variation in the width of the follower pulley 26.

In establishing the reverse state, the reverse clutch 53 is engaged, the low clutch 44 is engaged, and the high clutch 60 is released. The engagement of the reverse clutch 53 causes the reverse gear 38 to be connected to the hollow shaft 36 for unitary rotation. In this state, the torque of the drive shaft 14 is transmitted via the low clutch 44, the hollow shaft 36, the reverse clutch 53, the reverse gear 38, the reverse idler gear 56 and the reverse gear 50 to the output shaft 46. Since the reverse idler gear 56 is disposed in the power delivery path, the rotational direction of the output shaft 46 is the opposite to the rotational direction of the output shaft 46 in the cases previously descibed. Thus the vehicle can travel in the reverse direction.

Figure 3:
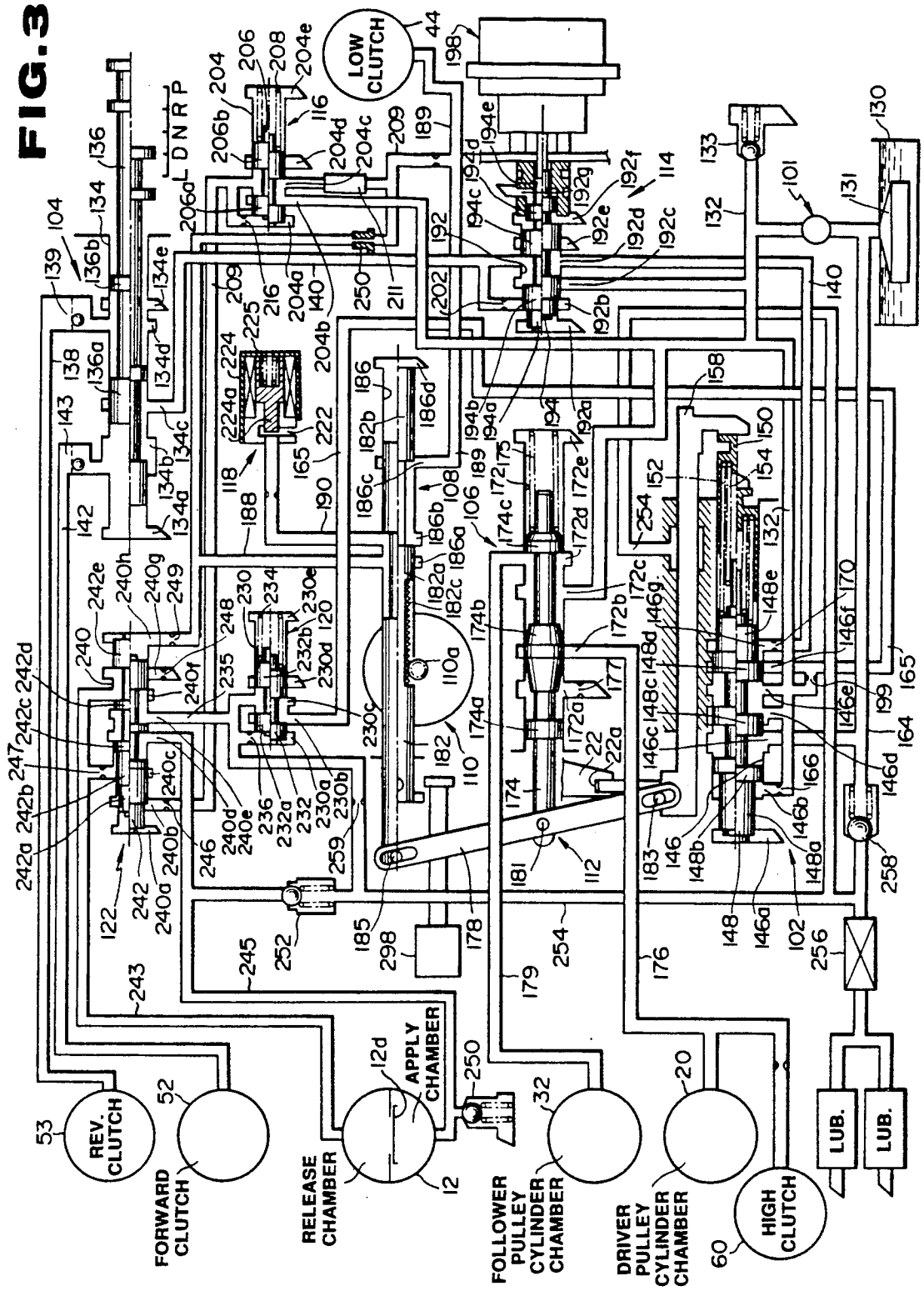
FIG. 3 is a hydraulic circuit of a control system for the hybrid transmission.

A hydraulic control system for this transmission is now described. As shown in FIG. 3, the control system comprises an oil pump 101, a line pressure regulator valve 102, a manual valve 104, a shift control valve 105, a direction control valve 108 for controlling direction of adjustment pressure (which may be called as a shift command valve), a shift operating mechanism 112, a throttle valve 114, a constant pressure regulating valve 116, a solenoid valve 118, a torque converter pressure regulating valve, and a lock-up control valve 122.

The shift control valve 106 has a valve bore 172 provided with five ports 172a, 172b, 172c, 172d and 172e, a spool 174 having three axially spaced lands 174a, 174b, and 174c slidably fit in the valve bore 172, and a spring 175 biasing the spool 174 to the left as viewed in FIG. 3. The port 172b communicates via a hydraulic fluid conduit 176 with the driver pulley cylinder chamber 20, and this conduit 176 communicates with the high clutch 60 at its servo chamber. The port 172a and the port 172e are drain ports, respectively. An orifice 177 is provided at the drain port 172a. The port 172d communicates via a hydraulic fluid conduit 179 with the follower pulley cylinder chamber 32. The port 172c communicates with a hydraulic fluid conduit 132 that serves as a line pressure circuit and thus is supplied with the line pressure. The spool 174 has a lefthand end, as viewed in FIG. 3, rotatably linked via a pin 181 to a middle portion of a lever 178 of the shift operating mechanism 112 which is later described in detail. The land 174b has an axial section with a curved contour. This allows a portion of hydraulic fluid supplied from the line pressure port 172c to flow into the port 172a. Thus, the pressure at the port 172b is determined by a ratio of the amount of hydraulic fluid flowing from the port 172c toward the port 172b to the amount of hydraulic fluid discharged out of the drain port 172a. If the spool 174 moves to the left as viewed in FIG. 3, this leftward movement of the spool 174 causes the degree of opening of a clearance on the line pressure side of the port 172b to increase, and the degree of opening of a clearance on the discharge side of the port 172b to decrease. This results in an increase in pressure at the port 172b. The port 172d is always supplied with the line presure from the port 172c. The hydraulic presure developed at the port 172b is supplied via the conduit 176 to the driver pulley cylinder chamber 20, while the hydraulic pressure developed at the port 172d is supplied to the follower pulley cylinder chamber 32. Therefore, the leftward movement of the spool 174, as viewed in FIG. 3, causes an increase in the hydraulic pressure developed in the driver pulley cylinder chamber 20, resulting in a decrease in the width of the V-shaped pulley groove of the driver pulley 16. This also results in an increase in the width of the V-shaped pulley groove of the follower pulley 26 since the V-belt 26 is wedged into the follower pulley 26. Therefore, the reduction ratio becomes small since the radius of the running diameter of the V-belt on the driver pulley 16 increases, but the radius of the running diameter of the V-belt 24 on the follower pulley 26 decreases.

The reduction ratio becomes large when the spool 174 is urged to move to the right as viewed in FIG. 3.

The shift operating mechanism 112 is connected to the spool 174 of the shift control valve 106 with the lever 178 thereof having its middle linked via the pin 181 to the spool 174. The lever 178 has a one or lower end, as viewed in FIG. 3, connected via a pin 183 to a reduction ratio transmission member 158 and an upper end connected via a pin 185 to the rod 182 of the direction control valve 108. The rod 182 is formed with a rack 182c which a pinion gear 110a of a shift motor 110 meshes with. According to this shift operating mechanism 112, rotating the pinion gear 110a of the shift motor 110 in such a direction as to move the rod 182 to the right, as viewed in FIG. 3, causes the lever 178 to rotate clockwise about the pin 183. This clockwise rotation of the lever 178 causes the spool 174 of the shift control valve 174 to move to the right, as viewed in FIG. 3. The rightward movement of the spool 174 of the shift control valve 106 causes a reduction in hydraulic pressure within the driver pulley chamber 20, causing the axially movable conical member 22 of the driver pulley 16 in such a direction as to increase the width of the V-shaped pulley groove. In FIG. 3, the conical member 22 moves to the left. Since the end of the lever 178 is connected via the pin 183 to the reduction ratio transmission member 158, this leftward movement of the conical member 22, as viewed in FIG. 3, causes the lever 178 to rotate clockwise about the pin 185. This clockwise rotation of the lever 178 pulls back the spool 174 to the left, as viewed in FIG. 3, causing an increase in hydraulic pressure within the driver pulley chamber 20, thus causing the reduction ratio to become small. As a result, the driver pulley 16 and the follower pulley 26 shift to stay in a stable state providing a reduction ratio, which stable state is predetermined to one rotary position which the shift motor 110 takes. If the shift motor 110 rotates in the opposite or reverse direction, the above-mentioned process develops. The rod 182 is moveable to the right, as viewed in FIG. 3, beyond a position at which the maximum and largest reduction ratio is induced toward an overstroke position. When the rod 182 has moved toward and stayed at the overstroke position, a change-over switch 298 is activated. The output signal of this switch 298 is fed to a control unit. It will now be recognized that when the shift motor 110 is operated in a predetermined shift pattern, the variation of the reduction ratio follows this pattern. Therefore, the variation in reduction ratio in the continuously variable transmission mechanism is controlled by controlling the shift motor 110.

Figure 4:
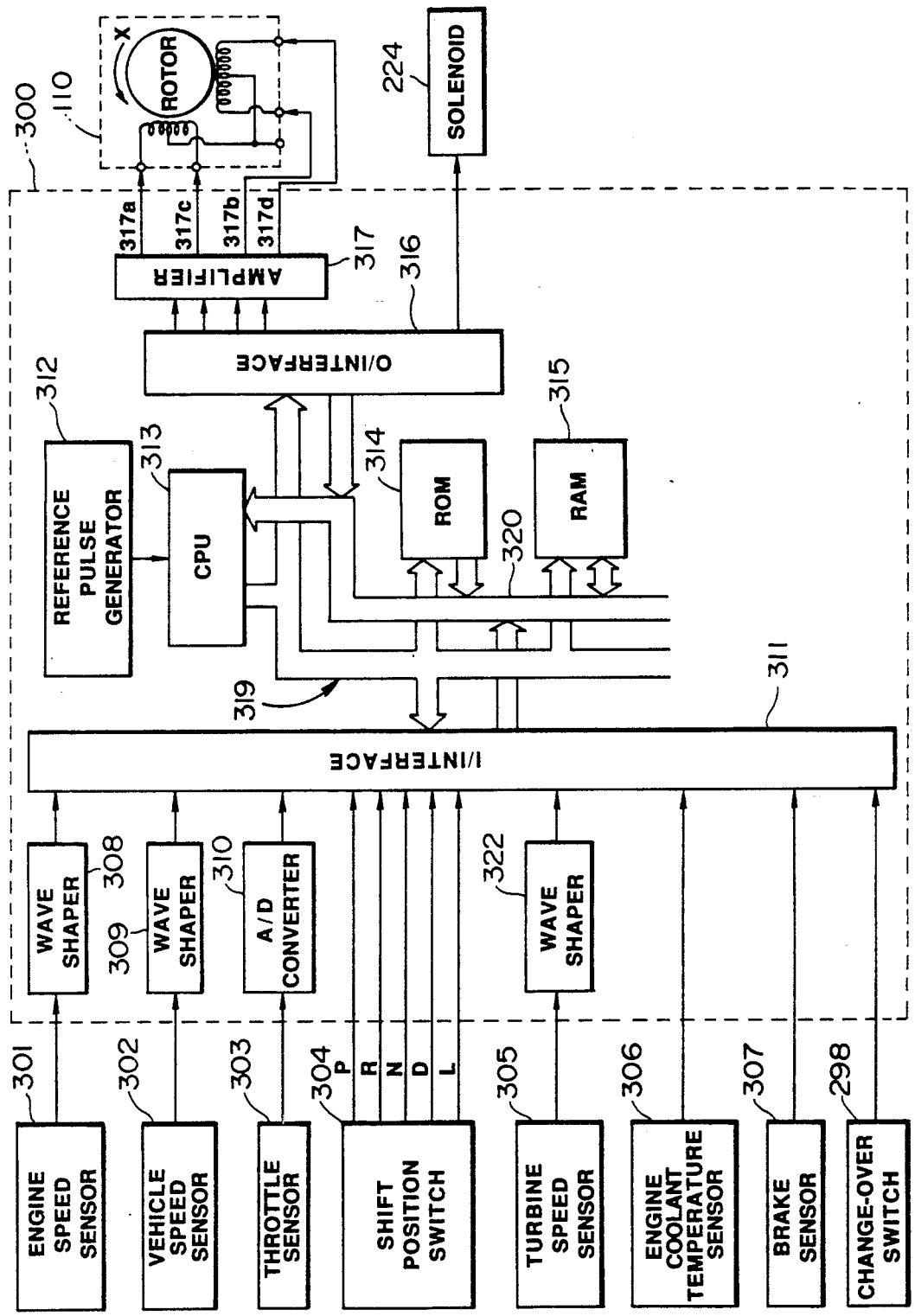
FIG. 4 is a block diagram of a control unit associated with sensors and a shift motor.

The rotary position which the shift motor 110 takes is determined by a number of pulses supplied to the shift motor 110 by a control unit 300 shown in FIG. 4. The control unit 300 stores a plurality of shift patterns and generates the number of pulses in accordance with one shift pattern selected out of all.

The direction control valve 108 includes a valve bore 186 provided with ports 186a, 186b, 186c and 186d, and a rod 182 with lands 182a and 182b recived in the valve bore 186. The port 186a communicates with a hydraulic fluid conduit 188. The port 186b communicates via a hydraulic fluid conduit 190 with the solenoid valve 118. The port 186c communicates with a hydraulic fluid conduit 189. The port 186d is a drain port. Normally, the ports 186a and 186b communicate with each other via a space defined between the lands 182a and 182b. When the rod 182 moves beyond the position corresponding to the maximum reduction ratio into the overstroke position, the port 186a is covered by the land 182a, while the port 186b is allowed to communicate with the port 186c. The above-mentioned hydraulic fluid conduit 189 communicates with the low clutch 44.

The other valves illustrated in FIG. 3 are substantially the same as their counterparts disclosed in laid-open Japanese Patent Application 61-105351. The hydraulic circuit except the low clutch 44 and the high clutch 60 is substantially the same as a hydraulic circuit of a control system disclosed in European Patent application published under publication number 0180209 on May 7, 1986 or U.S. Pat. No. 4,735,113 issued to Yamamuro et al. on Apr. 5, 1988.

Referring to FIG. 4, the control unit 300 comprises an input interface 311, a reference pulse generator 312, a central processor unit (CPU) 313, a read only memory (ROM) 314, a random access memory (RAM) 315 and an output interface 316. They are operatively interconnected by an address bus 319 and a data bus 320. Output signals of an engine speed sensor 301, a vehicle speed sensor 302, a throttle sensor 303, a shift position switch 304, a turbine speed sensor 305, an engine coolant temperature sensor 306, a brake sensor 307, and a changeover switch 298. These output signals are supplied directly or indirectly via wave shapers 308, 309, and 322, and a AD converter 310. Output signals of the control unit 300 are supplied via an amplifier and leads 317a, 317b, 317c and 317d to the shift motor 110 in the form of a stepper motor. The solenoid 224 is also under the control of the control unit 300. For further understanding of the control unit 300, reference should be made to U.S. Pat. No. 4,735,113 mentioned before.

The operation of this embodiment is hereinafter described. When the rotation of motor 110 toward the maximum and largest reduction ratio causes the rod 182 to move beyond the predetermined position corresponding to the maximum reduction ratio to the overstroke position, the direction control valve 108 takes a state as illustrated by the lower half thereof as viewed in FIG. 3. In this state of the direction control valve 108, the conduit 190 is allowed to communicate with the conduit 189, establishing a state where the hydraulic fluid pressure adjusted by the solenoid valve 118 is supplied to the low clutch 44. Thus, the torque capacity of the low clutch 44 becomes adjustable by the solenoid valve 118. Upon the direction control valve 108 staying in the overstroke position, the spool 174 of the shift control valve 106 which is linked via the lever 178 to the rod 182 is biased to the right as viewed in FIG. 3 and thus the port 172b is allowed to communicate with the drain port 172a. Thus, the driver pulley cylinder chamber 20 and high clutch 60 are drained. As a result, the high clutch 60 is released with the low clutch 44 left engaged and thus the torque is transmitted via the gearing mechanism. The torque is therefore multiplied at the reduction ratio determined by the forward gears 42 and 48, producing a large driving force.

When the operating condition progresses and demands a less driving force, the shift motor rotates toward the minimum and smallest reduction ratio, the rod 182 moves toward the minimum reduction ratio beyond the predetermined position corresponding to the maximum reduction ratio. This movement of the rod 182 causes the lever 178 to move the spool 174 to the left as viewed in FIG. 3. This causes the land 174b of the spool 174 to close communication of the port 172b with the drain port 172a and open communication of the port 172b with the line pressure port 172c, allowing the supply of hydraulic fluid to the port 172b from the line pressure port 172c. Thus, the driver pulley cylinder chamber 20 is supplied with the hydraulic fluid pressure and the high clutch 60 is also supplied with the hydraulic fluid pressure and engaged. Thereafter, the torque is transmitted by the continuously variable transmission mechanism and the reduction ratio is continuously variable by adjusting the widths of the V-shaped pulley grooves of the driver pulley 16. Under this operating condition, although the low clutch 40 is kept engaged, since the one-way clutch 40 idles, the torque is transmitted via the continuously variable transmission mechanism. The direction control valve 108 allows the conduit 188 to communicate with the conduit 190, rendering the solenoid valve 118 to control the lock-up control valve 122. Thus, the engagement of the lock-up clutch 12d is controlled by the solenoid valve 118. FIG. 5 shows a table where which one or ones of the clutches 52, 53, 44 and 60 and two pulley cylinder chambers 20 and 32 are supplied with hydraulic fluid pressure for each of five positions, namely P (parking), R (reverse), N (neutral), D (drive), and L (low) range positions, which the spool 136 of the manual valve 104 is placed at. The sign denotes the device to be supplied with hydraulic fluid pressure. Also shown in the table is the position which the direction control valve 108 takes in relation to the position which the spool 136 of the manual valve 104 assumes. The valve 108 assumes the overstroke position when the spool 136 of the manual valve 104 is placed at P or R or N range position. Since the valve 108 is in the overstroke position and the solenoid valve 118 drains the conduit 190 when the spool 136 of the manual valve 104 is placed at P or N range position, no hydraulic fluid pressure is applied to the low clutch 44, leaving same released. FIG. 6 shows the variations of a variety of different pressures versus the stroke of the rod 182 of the direction control valve 108. FIG. 7 shows the variations of pressures within the driver pulley cylinder chamber 20 and the follower pulley cylinder chamber 32 versus the stroke of the rod of the direction control valve 108.

Figure 8:
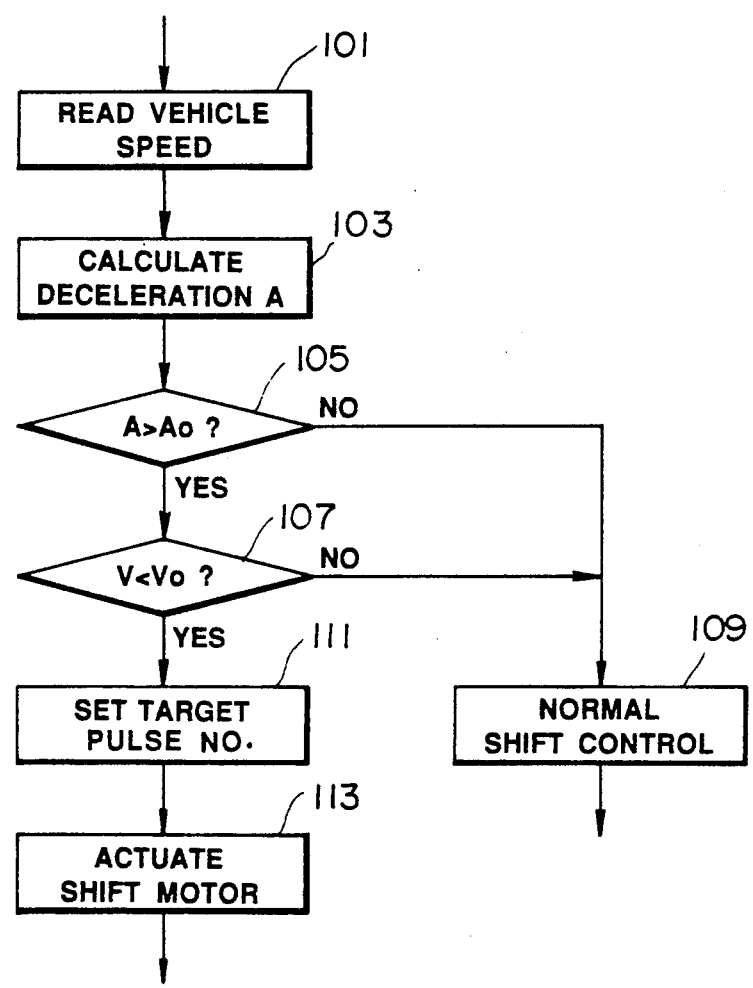
FIG. 8 is a flowchart of a program contained in the control unit.

Referring to the flowchart shown in FIG. 8, it is now explained how the control unit 300 operates during rapid deceleration. The ROM 314 of the control unit 300 stores a program as illustrated by the flowchart.

In FIG. 8, at a step 101, a reading operation of a vehicle speed is performed based on the output signal of the vehicle speed sensor 302. At a step 103, a deceleration A is calculated by subtracting a current vehicle speed stored in the present run from a previous vehicle speed stored in the previous run. At the subsequent step 105, it is determined whether or not the deceleration A stored at the step 103 is greater than a predetermined deceleration value $A_0$. If an answer to the inquiry at the step 105 is NO, the normal shift control is carried out at a step 109. If an answer to the inquiry at the step 105 is YES, the program proceeds to a step 107 where it is determined whether the vehicle speed stored at the step 101 is less than a predetermined vehicle speed value $V_0$, for example 10 km/h, or not. If an answer to the inquiry at the step 107 is NO, i.e., $V \geq V_0$, the program proceeds to the step 109. If an answer to the inquiry at the step 107 is YES, the program proceeds to a step 111 where a target pulse number, i.e., a target number of pulses corresponding to that position of the shift motor 110 which induces the valve 108 to assume the overstroke position. As shown in FIG. 5, when the valve 108 is urged to move to the overstroke position in response to the target pulse number, the high clutch 60 is released. At the sebsequent step 113, the output signals corresponding to the target pulse number are supplied to the shift motor 110 to urge the valve 108 to move to the overstroke position, thus releasing the engagement of the high clutch 60. In the above mentioned manner, the high clutch 60 is always released during rapid deceleration to change the torque delivery path from the continuously variable transmission mechanism to the gearing mechanism. Thus, even if an acceleration is initiated immediately after this rapid deceleration, there occurs no slip between the V-belt 24 and the driver pulley 16 since the transmission of torque is effected through the gearing mechanism. While the transmission of torque is being effected through the gearing mechanism, the continuously variable transmission can shift to the position at which the maximum reduction ratio thereof. Thus, even if a switch from the gearing mechanism to the continuously variable transmission mechanism is made, there occurs no slip between the V-belt 24 and the driver pulley 16.

What is claimed is:

1. A control system for a hybrid transmission of a motor vehicle, the hybrid transmission including a continuously variable transmission mechanism being combined with a gearing mechanism, the control system comprising:
    means for detecting a vehicle speed of the motor vehicle and generating a vehicle speed indicative signal indicative of the vehicle speed detected;
    means for detecting a deceleration which the motor vehicle is subject to and generating a deceleration indicative signal indicative of said deceleration detected; and
    means for effecting a switch from a torque delivery path through the continuously variable transmission to a torque delivery path through the gearing mechanism when said vehicle speed indicative signal indicates that the vehicle speed is lower than a predetermined vehicle speed value under a condition where said deceleration indicative signal indicates that a magnitude of deceleration is greater than a predetermined deceleration value.

2. A control method for a hybrid transmission of a motor vehicle, the hybrid transmission including a continuously variable transmission mechanism combined with a gearing mechanism, the control method comprising the steps of:
    detecting a vehicle speed of the motor vehicle and generating a vehicle speed indicative signal indicative of the vehicle speed detected;
    detecting a deceleration which the motor vehicle is subject to and generating a deceleration indicative signal indicative of said deceleration detected; and
    effecting a switch from a torque delivery path through the continuously variable transmission to a torque delivery path through the gearing mechanism when said deceleration indicative signal indicates that a magnitude of deceleration is greater than a predetermined deceleration value under a condition where said vehicle speed indicative signal indicates that the vehicle speed is lower than a predetermined vehicle speed value.

3. A control system for a hybrid transmission of a motor vehicle including a continuously variable transmission mechanism being combined with a gearing mechanism comprising:
    first means for detecting a vehicle speed of the motor vehicle and generating a vehicle speed indicative signal indicative of the vehicle speed detected;
    second means for detecting a deceleration which the motor vehicle is subject to and generating a deceleration signal indicative of said detected deceleration;
    third means for comparing said detected deceleration indicative signal with a predetermined signal deceleration value and generating a deceleration comparison signal;
    fourth means for comparing said detected vehicle speed indicative signal with a predetermined vehicle speed value and generating a vehicle speed comparison signal;
    fifth means for effecting a switch from a torque delivery path through the continuously variable transmission to a torque delivery path through the gearing mechanism when said deceleration comparison signal means indicates that said deceleration detected is greater than said predetermined deceleration value, and said vehicle speed comparison signal indicates that said detected vehicle speed is lower than said predetermined vehicle speed value.

4. In a hybrid transmission of a motor vehicle:
    a gearing mechanism;
    a continuously variable transmission mechanism combined with said gearing mechanism such that said continuously variable transmission mechanism is responsible for smaller reduction ratios than said gearing mechanism reduction ratios;
    first means for detecting a vehicle speed of the motor vehicle and generating a vehicle speed indicative signal indicative of the vehicle speed detected;
    second means for detecting a deceleration which the motor vehicle is subject to and generating a deceleration signal indicative of said detected deceleration;
    third means for comparing said detected deceleration indicative signal with a predetermined signal deceleration value and generating a deceleration comparison signal;
    fourth means for comparing said detected vehicle speed indicative signal with a predetermined vehicle speed value and generating a vehicle speed comparison signal;
    fifth means for effecting a downshift from a torque delivery path through the continuously variable transmission to a torque delivery path through the gearing mechanism when said deceleration comparison means indicates that said deceleration detected is greater than said predetermined deceleration value, and said vehicle speed comparison signal indicates that said detected vehicle speed is lower than the predetermined speed value.

* * * * *